Patented Aug. 19, 1952

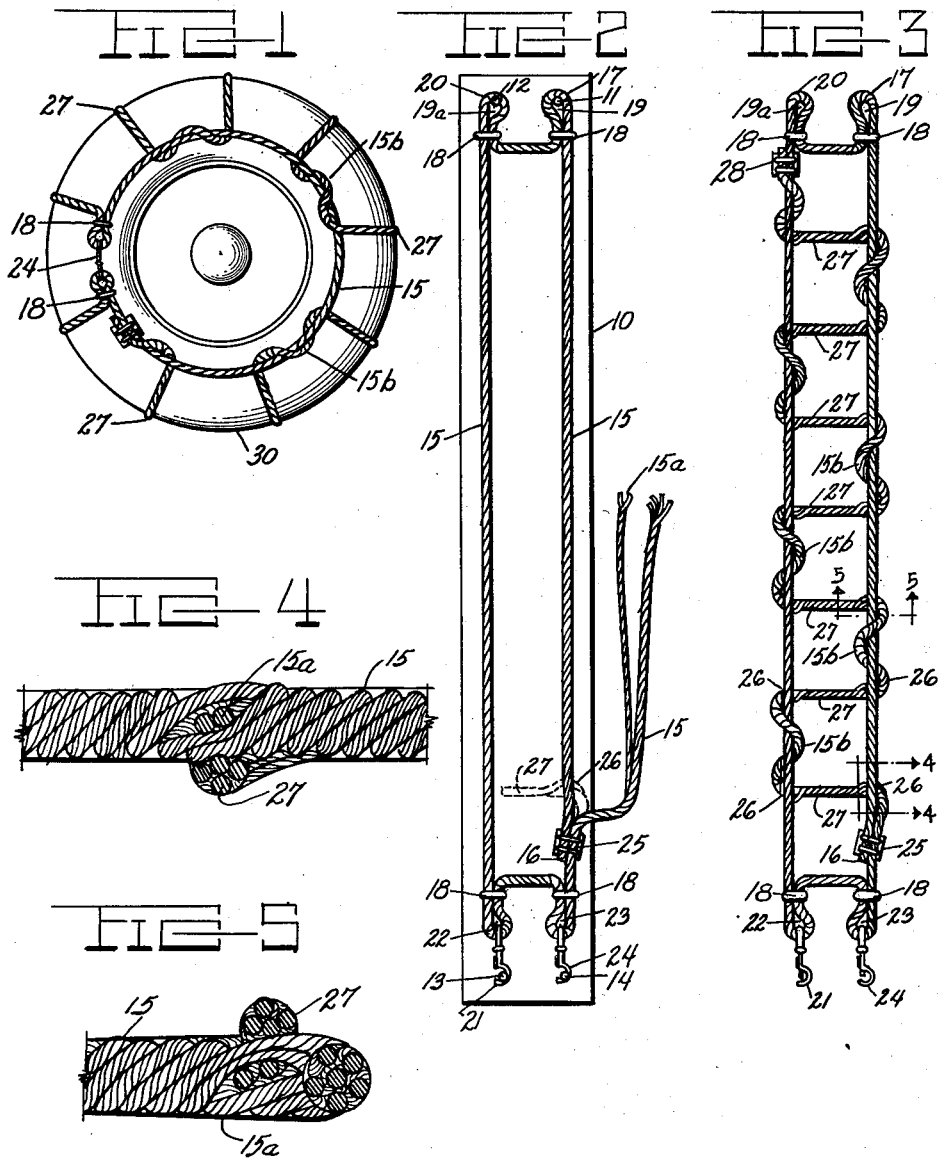

2,607,387

UNITED STATES PATENT OFFICE 2,607,387

NONSKID DEVICE

Edward J. Martin, Jr., Richmond Hill, N. Y.

Application June 4, 1948, Serial No. 31,176

3 Claims. (Cl. 152—221)

This invention relates to a nonskid device such ts is adapted to be attached to an automobile tire to decrease slipping and spinning of the drive wheels of a vehicle.

An object of this invention is to provide a nonskid device, for a vericle tire, constructed from a single continuous length of flexible wire rope or cable.

Another object is to provide a nonskid device, for a vehicle tire, having no traction parts of solid construction to mar the surface with which it is in contact.

Another object is to provide a nonskid device, for a vehicle tire, which is practically noiseless in operation.

Another object is to provide a nonskid device, for a vehicle tire, which is economical to manufacture, efficient in operation, easily applied, and which has relatively long life in use.

Another object is to provide a method of constructing a nonskid device, for a vehicle tire, from a single continuous length of flexible wire rope or cable.

Further objects and advantages of this invention, as well as its construction, arrangement and operation, will be apparent from the following description and claims when taken in connection with the accompanying drawing, in which:

Figure 1 is a front elevation of an automobile wheel and pneumatic tire with the device of this invention applied thereto, Figure 2 is a plan view of the initial arrangement for forming the device, Figure 3 is a plan view of the finished device, and Figures 4 and 5 indicate the method of interlacing the cable strands of the device at the crossovers, as taken on lines 4—4 and 5—5, respectively, of Figure 3.

In Figure 2 is shown the method of constructing the device of this invention wherein initially there is provided a temporary base or board 10 in which are secured nails or pins 11, 12, 13 and 14, to hold the cable frame to required dimensions.

A continuous length of flexible steel, bronze, or other suitable wire rope or cable 15 beginning at the cable end 16 is temporarily laid along the base board 10, looped at point 17 and a metal ring 18 slipped over the cable and the cable end then passed back through the ring to form an eye 19. The eye 19 is temporarily placed over the pin 11 and loop 20 similarly formed and eye 19a placed over pin 12 for temporary support until the frame portion of the device is completed. The cable 15 is then continued in reverse direction on the base 10 toward pin 13 where another ring 18 is slipped over the cable followed by the eye of a snap hook 21 and the cable end passed back through the ring 18 to form eye 22. The snap hook 21 is then placed over the pin 13. Eye 23 is similarly formed and snap hook 24 placed over pin 14. The cable is then drawn taut and secured to the initial end 16 by means of a double clamp 25 forming a rectangular frame on which the transverse members will be supported and secured.

At a suitable distance beyond the clamp 25 two strands 15a of the free end of the cable 15 may be unwound, the cable bent at right angles and the two unwound strands inserted between two upraised strands of the frame at point 26, as shown in Figures 4 and 5, to secure and form a transverse member 27. The unwound strands may then be rewound in place and the operation repeated at each successive crossover point 26, as shown in Figure 3, forming a series of transverse members 27 suitably spaced throughout the length of the longitudinal sides of the frame. Between the crossovers 26 the free end of the cable may be looped at 15b around the longitudinal frame members as shown to impart the desired support to the transverse members. When all of the transverse members 27 have been thus provided the remaining free end of the cable may then be secured to the longitudinal frame member by means of a double clamp 28.

The completed device is then removed from the pins 11, 12, 13 and 14, and is ready to be applied to a pneumatic tire 30 (Figure 1) by placing it around the tire, as shown in Figure 1, and securing in place by inserting snap hooks 21 and 24 in the eyes 19 and 19a, respectively, of the opposite end of the frame.

If desirable the exposed portions of the transverse members or cross pieces 27 may be given a coat of hot spelter to protect them against excessive abrasive wear and the wire rope and fittings may be galvanized to prevent undue corrosion.

It will be readily understood that when in operation this device will produce a minimum of noise, wear, breakage and resulting damage to the vehicle such as often occurs when chain links, of which similar devices are made, break and that the surface of the tire and the roadway on which this device may be used will suffer less wear and damage than when similar devices constructed of solid metal links and the like are used.

It is to be understood that various modifications and changes may be made in this invention without departing from the spirit and scope thereof, as set forth in the appended claims.

What is claimed is:

1. A nonskid device for a pneumatic tire formed of a single length of cable consisting of a plurality of strands twisted about each other, said cable having a portion forming a first longitudinal supporting member, a portion of said cable adjacent a terminating point of said first supporting member being bent back toward and extending parallel to said supporting member and being connected with the latter named member to form a first longitudinally extending loop, said cable adjacent the connection of said loop with said first supporting member extending transversely of said first supporting member to form a first traction member, a portion of said cable adjacent the terminating point of said first traction member being bent toward and extending parallel to said first loop and thence back upon itself and being connected to the adjacent portion of said cable to form a second longitudinally extending loop, said cable having a portion extending from the connection of said second loop and terminating at a point spaced from the latter connection to form a second longitudinal supporting member, a portion of said cable adjacent the terminating point of said second supporting member being bent back toward and extending parallel to said last named supporting member and being connected with the latter named member to form a third longitudinally extending loop, said cable adjacent the connection of said third loop with said second supporting member extending transversely of said second supporting member to form a second traction member, a portion of said cable adjacent the terminating point of said second traction member being bent toward and extending parallel to said third loop and thence back upon itself and being connected to the adjacent portion of said cable to form a fourth longitudinally extending loop, said cable adjacent the connection of said fourth loop being secured to said first supporting member, the remainder of said cable being passed back and forth between and in interlocking relation with said first and second supporting members to form additional traction members with the other end of said cable being secured to one of said supporting members, and a snap hook dependingly supported from each of said third and fourth loops.

2. A nonskid device for a pneumatic tire formed of a single length of cable consisting of a plurality of strands twisted about each other, said cable having a portion forming a first longitudinal supporting member, a portion of said cable adjacent a terminating point of said first supporting member being bent back toward and extending parallel to said supporting member and being connected with the latter named member to form a first longitudinally extending loop, said cable adjacent the connection of said loop with said first supporting member extending transversely of said first supporting member to form a first traction member, a portion of said cable adjacent the terminating point of said first traction member being bent toward and extending parallel to said first loop and thence back upon itself and being connected to the adjacent portion of said cable to form a second longitudinally extending loop, said cable having a portion extending from the connection of said second loop and terminating at a point spaced from the latter connection to form a second longitudinal supporting member, a portion of said cable adjacent the terminating point of said second supporting member being bent back toward and extending parallel to said last named supporting member and being connected with the latter named member to form a third longitudinally extending loop, said cable adjacent the connection of said third loop with said second supporting member extending transversely of said second supporting member to form a second traction member, a portion of said cable adjacent the terminating point of said second traction member being bent toward and extending parallel to said third loop and thence back upon itself and being connected to the adjacent portion of said cable to form a fourth longitudinally extending loop, said cable adjacent the connection of said fourth loop being secured to said first supporting member, the remainder of said cable having its strands separated, the separated strands being passed back and forth transversely through and in interlacing relation with the strands of said first and second supporting members to form additional spaced traction members with the other end of said cable being secured to said second supporting member adjacent said third loop, and a snap hook dependingly supported from each of said third and fourth loops.

3. A nonskid device for a pneumatic tire formed of a single length of cable consisting of a plurality of strands twisted about each other, said cable having a portion forming a first longitudinal supporting member, a portion of said cable adjacent a terminating point of said first supporting member being bent back toward and extending parallel to said supporting member and being connected with the latter named member to form a first longitudinally extending loop, said cable adjacent the connection of said loop with said first supporting member extending transversely of said first supporting member to form a first traction member, a portion of said cable adjacent the terminating point of said first traction member being bent toward and extending parallel to said first loop and thence back upon itself and being connected to the adjacent portion of said cable to form a second longitudinally extending loop, said cable having a portion extending from the connection of said second loop and terminating at a point spaced from the latter connection to form a second longitudinal supporting member, a portion of said cable adjacent the terminating point of said second supporting member being bent back toward and extending parallel to said last named supporting member and being connected with the latter named member to form a third longitudinally extending loop, said cable adjacent the connection of said third loop with said second supporting member extending transversely of said second supporting member to form a second traction member, a portion of said cable adjacent the terminating point of said second traction member being bent toward and extending parallel to said third loop and thence back upon itself and being connected to the adjacent portion of said cable to form a fourth longitudinally extending loop, said cable adjacent the connection of said fourth loop being secured to said first supporting member, the remainder of said cable having its strands separated, the separated strands being passed back and forth transversely through and in interlacing relation with the strands of said first and second supporting members to form additional spaced traction members with the other end of said cable being secured to said second supporting member adjacent said third loop, the portions of the separated strands of said cable intermediate said additional spaced traction members being alternately twisted about said first and second supporting members, and a snap hook dependingly supported from each of said third and fourth loops.

EDWARD J. MARTIN, JR.

REFERENCES CITED

The following references are of record in the file of this patent:

UNITED STATES PATENTS

| Number | Name | Date |
| --- | --- | --- |
| 958,773 | Sado | May 24, 1910 |
| 1,718,509 | West | June 25, 1929 |
| 1,932,576 | Dodge | Oct. 31, 1933 |